(12) United States Patent
Miller et al.

(10) Patent No.: US 6,501,046 B1
(45) Date of Patent: Dec. 31, 2002

(54) METHOD AND APPARATUS FOR MARKING CONTAINERS USING LASER LIGHT

(75) Inventors: Timothy J. Miller, Winter Park, FL (US); Edward C. Miller, Broomfield, CO (US)

(73) Assignee: Ball Corporation, Broomfield, CO (US)

( * ) Notice: Subject to any disclaimer, the term of this patent is extended or adjusted under 35 U.S.C. 154(b) by 66 days.

(21) Appl. No.: 09/690,282

(22) Filed: Oct. 16, 2000

Related U.S. Application Data

(62) Division of application No. 09/564,429, filed on May 4, 2000, which is a continuation of application No. 09/116,794, filed on Jul. 16, 1998, now Pat. No. 6,080,958.

(51) Int. Cl.$^7$ .............................................. B23K 26/00
(52) U.S. Cl. ...................... 219/121.69; 220/906; 29/412
(58) Field of Search ..................... 219/121.68, 121.69, 219/121.6, 121.85; 220/906; 29/412

(56) References Cited

U.S. PATENT DOCUMENTS

| | | | |
|---|---|---|---|
| 3,281,024 A | 10/1966 | Henchert et al. ............ 222/484 |
| D210,870 S | 4/1968 | Markert ........................ D9/356 |
| 3,627,858 A | 12/1971 | Parts et al. .................... 264/25 |
| 3,796,344 A | 3/1974 | De Phillips et al. .......... 220/54 |
| 3,822,496 A | 7/1974 | Minder ........................ 40/307 |
| 3,958,354 A | 5/1976 | Hough et al. ................ 40/307 |
| 4,024,545 A | 5/1977 | Dowling et al. .... 219/121.68 X |
| D261,364 S | 10/1981 | Smyth ........................ D9/438 |
| 4,304,981 A | 12/1981 | Gappa ........................ 219/121 |
| 4,322,016 A | 3/1982 | Barrash ....................... 220/270 |
| 4,331,256 A | 5/1982 | Helms ......................... 220/267 |
| 4,363,179 A | 12/1982 | Ruemer, Jr. et al. .......... 40/307 |
| D268,250 S | 3/1983 | Smyth ........................ D9/438 |
| 4,380,129 A | 4/1983 | Barrash ....................... 40/307 |
| 4,393,411 A | 7/1983 | Amtower ..................... 358/302 |
| 4,459,910 A | * 7/1984 | Taube ........................ 101/18 |
| 4,465,204 A | 8/1984 | Kaminski et al. ............ 220/269 |
| 4,485,935 A | 12/1984 | Stofel ......................... 220/270 |
| 4,530,631 A | 7/1985 | Kaminski et al. ............. 413/12 |
| 4,578,329 A | 3/1986 | Holsappel ..................... 430/18 |
| 4,635,545 A | 1/1987 | Kubacki et al. ............... 101/4 |
| D289,017 S | 3/1987 | Spangler et al. ............. D9/438 |
| 4,803,136 A | 2/1989 | Bowsky et al. ............... 429/56 |
| 4,922,077 A | 5/1990 | Gordon ................. 219/121.68 |
| 4,965,829 A | 10/1990 | Lemelson ..................... 382/1 |
| 4,998,641 A | 3/1991 | Willoughby ................. 220/268 |
| 5,125,780 A | 6/1992 | Budenbender ................. 413/4 |

(List continued on next page.)

FOREIGN PATENT DOCUMENTS

| AU | 81794 | 9/1995 | ........... B21D/51/44 |
|---|---|---|---|
| DE | 41 03 746 | 8/1993 | ........... B65D/17/40 |
| DE | 19507827 A1 | 8/1996 | ............ 219/121.68 |

(List continued on next page.)

OTHER PUBLICATIONS

U.S. patent application Ser. No. 08/069,200; Jendick; filed Apr. 29, 1998.

*Primary Examiner*—Samuel M. Heinrich
(74) *Attorney, Agent, or Firm*—Sheridan Ross P.C.

(57) ABSTRACT

A portion or component of a metal container is provided with markings or indicia using laser light. High-speed laser steering is used to position laser light or laser light pulses across a lateral and longitudinal extent in a relatively short time period such as a time period selected so as to avoid slowing, stopping or otherwise interfering with other container or container component production processes. Preferably, tab stock for container-opening tabs can be provided with 6 to 9 or more visible characters within a time window of 50 to 100 milliseconds or less. Preferably, the size and resolution provided by the pulses are sufficient to permit legible, and preferably attractive, formation of any standard typewriter characters. In one embodiment, other logos, designs, textures, backgrounds and similar features can be provided.

11 Claims, 5 Drawing Sheets

U.S. PATENT DOCUMENTS

| | | | |
|---|---|---|---|
| 5,170,279 A | 12/1992 | Schwartz et al. | 359/217 |
| 5,191,695 A * | 3/1993 | Pavely et al. | 29/451 |
| 5,202,199 A | 4/1993 | Mitzutani et al. | 429/176 |
| 5,215,864 A | 6/1993 | Laakmann | 430/293 |
| 5,235,454 A | 8/1993 | Iwasaki | 359/198 |
| 5,315,108 A | 5/1994 | Gross | 250/233 B |
| 5,331,443 A | 7/1994 | Stanisci | 359/2 |
| 5,401,979 A | 3/1995 | Kooijman et al. | 250/561 |
| 5,416,951 A | 5/1995 | Keyaki et al. | 24/431 |
| 5,492,077 A | 2/1996 | Rose | 116/307 |
| 5,523,125 A | 6/1996 | Kennedy et al. | 427/555 |
| 5,578,120 A | 11/1996 | Takahashi et al. | 106/438 |
| 5,653,900 A | 8/1997 | Clement et al. | 219/121.68 |
| 5,719,372 A | 2/1998 | Togari et al. | 219/121.61 |
| 5,751,436 A | 5/1998 | Kwon et al. | 358/299 |
| 5,799,815 A | 9/1998 | Lang | 220/258 |
| 5,800,724 A | 9/1998 | Habeger et al. | 216/35 |
| 5,837,962 A | 11/1998 | Overbeck | 219/121.68 |
| 5,855,969 A | 1/1999 | Robertson | 427/555 |
| 6,105,806 A * | 8/2000 | Stasiuk | 220/269 |

FOREIGN PATENT DOCUMENTS

| | | | | |
|---|---|---|---|---|
| DE | 197 01 547 A1 | 3/1998 | | B44C/1/22 |
| EP | 289 022 | 11/1988 | | B65D/17/34 |
| EP | 0 482 776 A1 | 4/1992 | | B65D/7/24 |
| EP | 650153 A3 | 8/1997 | | 219/121.68 |
| FR | 2 649 628 | 7/1989 | | B23H/7/38 |
| FR | 2 750 396 | 6/1996 | | B65D/17/34 |
| GB | 1124958 | 8/1968 | | B65D/17/16 |
| GB | 2 185 613 A | 7/1987 | | G09F/23/00 |
| GB | 2 320 008 | 6/1988 | | B65D/17/32 |
| JP | 63-205291 | 8/1988 | | B41M/5/26 |
| JP | 5-178346 | 7/1993 | | B65D/17/32 |
| JP | 8-53121 | 2/1996 | | J65D/1/12 |
| JP | 08168890 | 7/1996 | | 219/121.68 |
| JP | 8-175006 | 7/1996 | | |
| JP | 63-252746 | 10/1998 | | |
| WO | WO 97/47397 | 12/1997 | | B05D/3/00 |

* cited by examiner

METHOD AND APPARATUS FOR MARKING CONTAINERS USING LASER LIGHT

This application is a Divisional of Ser. No. 09/564,429, filed May 4, 2000 which is a continuation of Ser. No. 09/116,794, filed Jul. 16, 1998 (now U.S. Pat. No. 6,080,958), both incorporated herein by reference.

FIELD OF THE INVENTION

The present invention relates to the use of a laser for marking containers including container body end tab portions and in particular to a process that can rapidly achieve the desired amount of marking within a predetermined time such as a manufacturing process dwell time.

BACKGROUND OF THE INVENTION

As part of a container manufacturing, or in some cases, filling or sealing operation, markings may be placed on containers for a variety of purposes including identifying contents, identifying the location or date of manufacture or use, identifying the maker of the container or container component, the style or materials for the container, providing of trade names, advertising, promotion, or the like. In some situations, promotional information in the form of sweepstakes, contests, or other valuable tokens or indicia are placed or marked on container or container components.

A variety of devices and procedures have been used for marking containers. In some cases, embossing or incising processes have been used. Embossing or incising, e.g. via stamping, can require an undesirably large inventory of tools, e.g. for different kinds of lettering or symbols, and typically requires the need to shut down an assembly line and disassemble a press whenever it is desired to change tools (such as for changing the indicia being incised or embossed or for maintenance or repair purposes). Such shutdowns are particularly troublesome when it is desirable to change the symbols with relatively high frequency, such as when markings on containers are intended as part of a contest or sweepstakes in which there are preferably a relatively large number of different possible markings or indicia (e.g. when only some of which are "grand prize" winners). Furthermore, it has been difficult to accurately control the depth of embossing or incising and, in some cases, embossing or incising that is too deep has led to leakage or container failure.

Accordingly, it would be advantageous to provide for marking of containers or components in a fashion permitting markings or indicia to be changed with relatively high frequency but without the need to stop or slow down a production line for this purpose. It would also be useful to provide for marking containers while avoiding the need for maintaining relatively large inventories of tools or dies, and preferably while avoiding container quality problems such as may arise from markings which are excessively deep.

Another process which has been used for placing markings on containers or components thereof, has been one or more printing processes. Contact or press printing is sometimes useful for decorating or placing markings on containers where it is desired to place a relatively large number of identical markings on containers. However, contact printing is believed impractical for many components, because of their shape or position (such as container-opening tabs) or when it is desired to change indicia with relatively high frequency (e.g. for sweepstake or contest purposes) because of the need to stop a production line and partially disassemble the contact print device in order to change the configuration of the items being printed on the containers.

In some situations, components of containers may be printed using a non-contact printing process such as an inkjet process. Although inkjets can be controlled to provide relatively frequent changes in indicia, inkjet processes and equipment have been found, in the past, to be relatively unreliable such as requiring frequent maintenance and repair. Inkjet processes have also been found to be subject to unwanted placement or positioning of ink such as resulting in a mist of ink which can interfere with the printing process, cause undesired markings on cans, or cause equipment malfunction. In some cases, it has been found that up to 20% or more of potential production time has been lost to the need for cleaning up, maintenance and/or repair when an ink jet process is used. Additionally, it has been found difficult to achieve reliable adhesion of the ink to containers or container components. Furthermore, when inkjet or other printing processes are used in connection with contest sweepstakes or providing other valuable tokens or indicia, since the process provides only surface markings (without forming indentations e.g. in the container itself) there is an undesirably large potential for counterfeiting or altering the markings e.g. in an attempt to claim a contest or sweepstakes prize. Furthermore, inkjet processes have been difficult to provide at high speed while maintaining quality, so as to mark letters or other indicia without distortion or the like.

Accordingly, it would be useful to provide for high quality marking of containers or container components while avoiding the cleanup, maintenance and repair time associated with inkjet or other printing processes, preferably while permitting relatively rapid changes of indicia.

Some or all of the above difficulties in previous container marking procedures are particularly troublesome for metallic containers or container components such as a typical aluminum alloy beverage container (e.g. of the type available from Ball Corporation, Broomfield, Colo.) or tabs or other components thereof. As compared with, e.g., plastic containers or container components, metal containers can be relatively difficult to mark, at least because it can be difficult to adhere ink to metal surfaces, because of the harder surface of metal containers, higher melting or softening point, and the like. Accordingly, devices and processes used in connection with some container materials are not necessarily applicable to others. In most situations, the functions or purposes for container markings will rarely justify use of procedures which would involve expenses which are substantially in excess of those involved with current processes. Accordingly, it would be useful to provide for procedures and devices for marking containers which can be achieved economically, preferably without substantially exceeding costs or expenses associated with current container production, filling or sealing processes.

SUMMARY OF THE INVENTION

The present invention provides for using laser light for marking metal containers or container components (including, e.g., container bodies, container ends and container end tabs). In one embodiment, a laser is provided with rapid-acting beam-steering and control to permit the marking of a relatively large number of characters or symbols (such as 6 or more, preferably 9 or more) in a relatively short period of time (such as less than about 100 milliseconds, preferably less than a normal component production dwell time e.g. of about 50 milliseconds) so that the desired marking can be achieved without stopping or slowing current container or container component fabrication procedures or machines.

In one embodiment, steering of a laser beam is achieved with high rapidity by reducing the mass of one or more steering mirrors. The resultant device delivers sufficient power density to form visible marks in a metal (e.g. aluminum) container component despite the decreased beam size or aperture associated with the smaller mirror size.

Preferably, the laser light is delivered to the container region or component as a series of high intensity laser pulses. Each pulse forms a visible ablated area or dot and the pattern of dots together make up the desired symbol or image. Accordingly, to achieve a desired number of characters or symbols in less than a predetermined period of time, the device must be capable of delivering all of the pulses needed for forming all of the desired characters within the predetermined time period. In one embodiment, a laser device is provided which delivers pulses at a frequency of at least about 12 kiloHertz (kHz) while providing sufficient power that substantially all such pulses produce the desired spot ablation of the metal container component.

DETAILED DESCRIPTION OF THE PREFERRED EMBODIMENT

Figure 1:
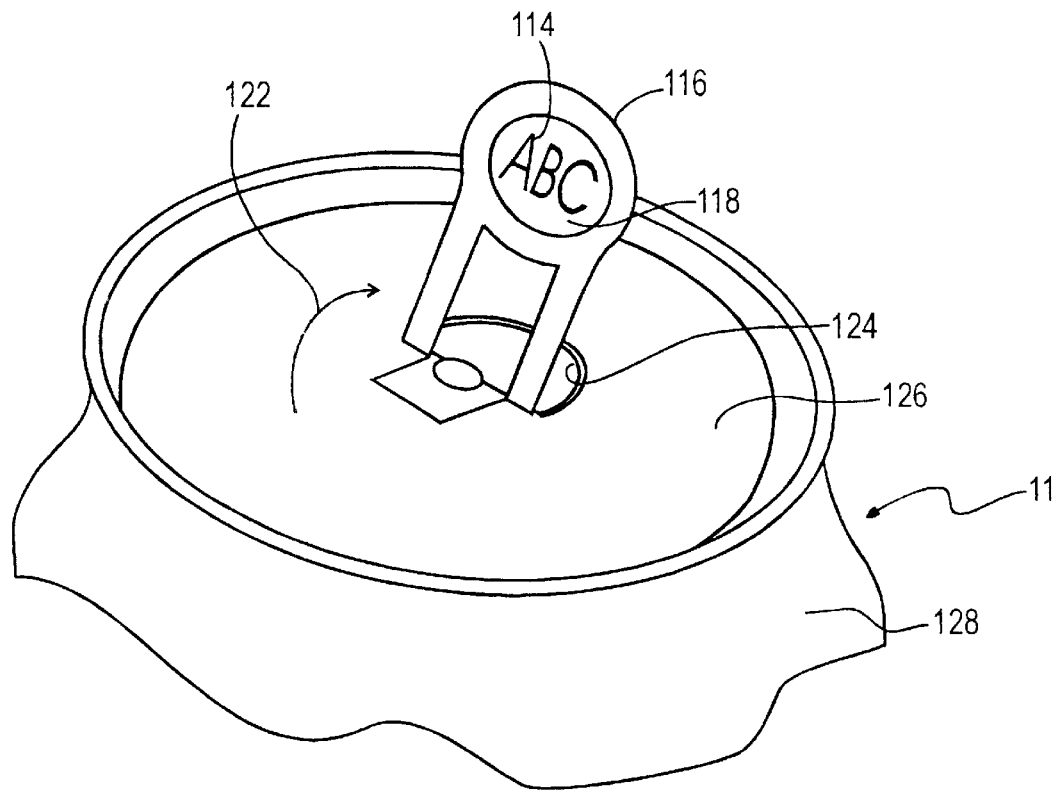
FIG. 1 is a partial perspective view of a container end with a tab marked according to an embodiment of the present invention.

Although the present invention can be used in marking many portions of a container or a container component and marking many shapes and styles of containers, FIG. 1 depicts one example of a container 112 having a marking 114 positioned on a container-opening tab. In the depicted embodiment, the tab 116 includes a covered or web area 118 in the central digit-grasping portion of the tab 116 and, in this embodiment, it is a portion of the web region 118 which bears the marking 114. FIG. 1 shows a configuration in which the tab 116 has been lifted 122 to a vertical position, revealing the underside of the tab (the surface visible in FIG. 1) and, in the process, forming an opening 124 in the can end 126. In the embodiment of FIG. 1, the underside of the tab which is visible in FIG. 1 would normally be nonvisible prior to opening the container, i.e. would be maintained adjacent the outer (public) surface of the container end 126. The upper surface of the tab is not visible in the view of FIG. 1 but would be visible prior to opening the container. Accordingly, the embodiment of FIG. 1 can be used in connection with providing prize or other promotional indicia or other situations in which it is not desired or not necessary for the markings to be visible prior to opening the container. The present invention, however, can be used in connection with marking other surfaces of the container including portions of the underside of the tab other than the central web 118, portions of the upper surface of the tab, portions of inner or outer surfaces of the container end 126 (and/or the opposite end, not shown in the partial view of FIG. 1), and/or inner or outer surfaces of the container body 128.

When it is desired to provide markings on one or more regions of a container-opening tab 116, the markings, in one embodiment, are provided in conjunction with a tab-forming process. In many situations, tab-forming is accomplished by feeding a web of tab stock into a forming machine which uses well known metalworking procedures for forming the substantially flat tab stock into the desired tab shape. Examples of some of the metalworking procedures which may be used include stamping, coining, folding, cutting and the like. For economy of expression, references below to tab-stamping or tab-forming should be understood to include these and other well known tab-forming processes and machines.

Figure 3:
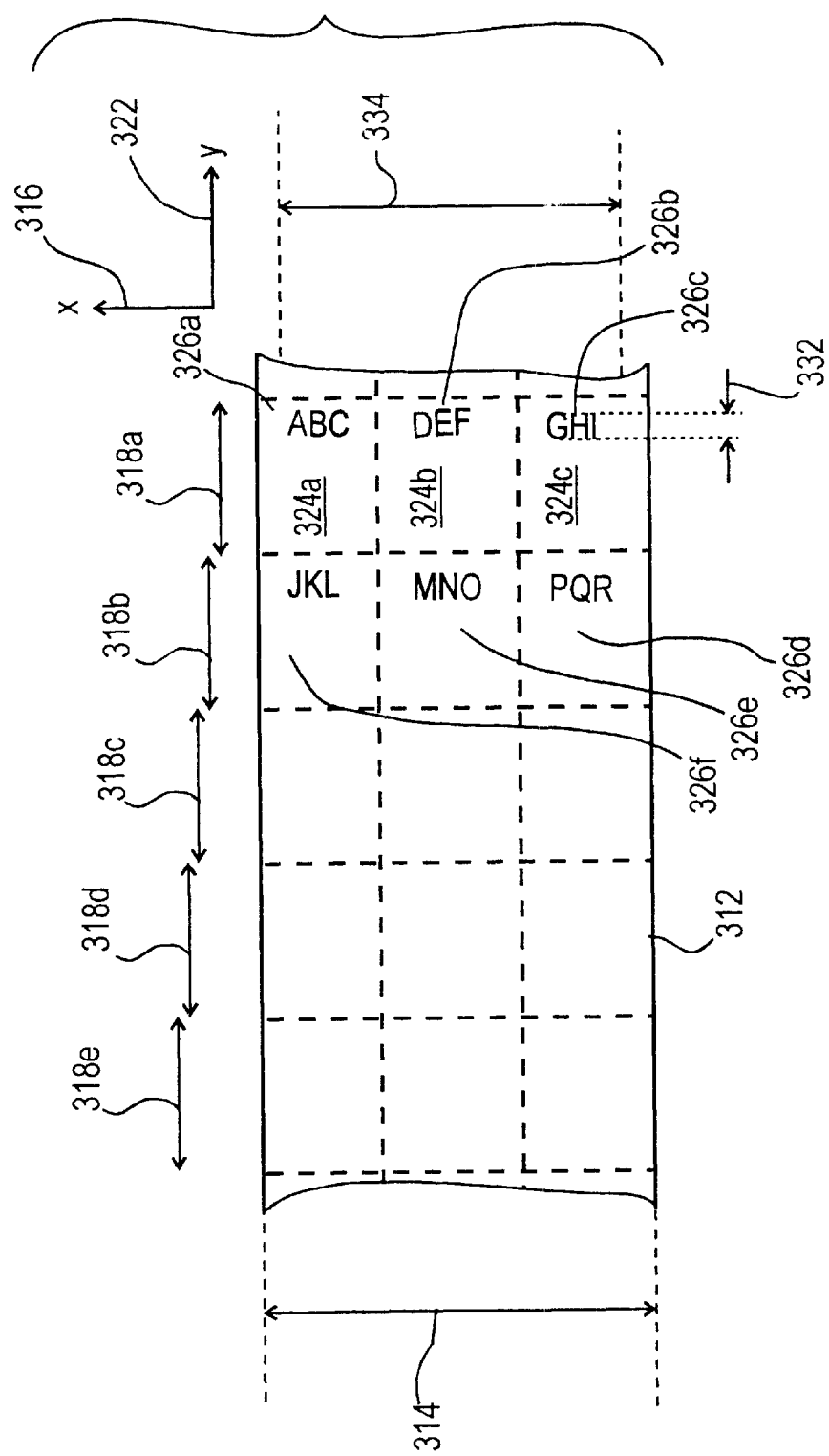
FIG. 3 is a partial plan view of partially-marked tab stock according to an embodiment of the present invention.

As depicted in FIG. 3, in one embodiment the tab stock 312 has a width 314 (i.e. a lateral or x dimension 316) sufficient to form three tabs from a predetermined longitudinal length 318$a,b,c,d,e$ of tab stock 312 (i.e. a length along the longitudinal or y dimension 322). Although the tab stock 312 may have great longitudinal length, such as a web with a length of 3000 meters or more, the tab stock 312 is dimensioned, and in particular, has a width 314 such that each predetermined length 318$a$, 318$e$ contains sufficient material to form a plurality of tabs, and in the depicted embodiment, sufficient material to form three tabs. Thus, predetermined length 318$a$ can be used to form one tab from each of three laterally arranged regions 324$a,b,c$.

In one configuration, the tab stock 312 is fed or advanced to a tab-stamping device in an intermittent fashion. According to such intermittent feeding, the tab stock 312 is advanced longitudinally a distance equal to the predetermined distances 318$a,b,c,d,e$ during a first (or "advancement") period. Thereafter, the tab stock 312 is held substantially stationary for a second (or "dwell") period, during which stamping and other operations are performed on one or more predetermined lengths of the tab stock to form, e.g., three tabs. Thus, each cycle of the tab-stamping device includes an advancement period and a dwell period. These cycles are repeated, one after another, preferably forming a plurality of tabs (such as three tabs) at each cycle or stroke of the stamping machine. It should be understood that the stamping machine may be configured to have a plurality of stations or operations e.g. such that, during any one cycle, a first predetermined length 318 is undergoing a first operation, such as cutting, while preceding predetermined lengths 318$b$, 318$c$, 318$d$, etc. are undergoing other operations such as coining, folding, and the like.

Preferably, the tab-stamping cycles are relatively short such as defining a cycle time of less than about 150 milliseconds, preferably less than about 100 milliseconds, in at least one embodiment, a cycle time of about 87 milliseconds (equivalent to a stamping machine having 700 strokes per minute). In one embodiment, the dwell time is about ⅔ of the cycle time and accordingly, the dwell time may be, e.g., about 100 milliseconds, preferably about 50 milliseconds or less.

In one embodiment, the desired markings are formed on the tab stock prior to reaching the stamping operations (i.e. the markings on any given region of the tab stock are formed before that region reaches the stamping device). By configuring the marking operation in conjunction with the stamping operation, registering or positioning the markings on the tab stock so as to reside at the desired region of a finished tab is facilitated.

In order to avoid distortion of the markings that might otherwise be associated with the relatively high acceleration curves used during the advancement phase of the cycle, it is preferred to achieve at least some, and, preferably substantially all of the marking during the stationary or dwell phase of each cycle. Accordingly, in this embodiment, the dwell time defines the length of time (or "window") available for making the desired markings on any given predetermined length 318a, 318b, 318c, 318d, 318e of the tab stock 312. According to the present invention, markings 326a–f are made on the tab stock 312 using laser light. Preferably the laser light is pulsed light, with each pulse being available for forming a single spot or dot such that a plurality of spots are positioned to, together, give the appearance or image of the desired characters or other markings. For example, for aluminum alloys typically used for tab stock, it is believed that delivering laser pulses will suffice to deliver sufficient power to achieve the ablation of aluminum necessary to provide visible spots. In one embodiment, the tab stock is formed of an alloy available under the trade designation 5042, e.g. from Aluminum Company of America or Kaiser Aluminium. Accordingly, the present invention is configured to achieve delivery of laser pulses, each with sufficient power to make a visible dot, sufficient in number to form the desired number and size of characters (with the desired quality or resolution) within the dwell time available for such marking considering any pulse non-application or blanking time e.g. used for accommodating relatively larger mirror movements such as movements between characters or between sets of characters.

In one embodiment, the device delivers pulses at a rate of about 12 kHz and produces at least 6, preferably at least nine characters of the desired quality with a character or letter height 332 of about 0.125 inches (about 3 mm) over a lateral range 334 of about 1 inch (about 2.5 cm).

Thus, in addition to providing a sufficient number of dots within the time window to form the desired size and quality of characters, the present invention is also configured to position those dots, as needed, across an area of tab stock having a lateral extent 334 of about 1 inch and a longitudinal extent 332 of about 0.125 inches, i.e., over an area of about 0.125 square inches.

Figure 2A:
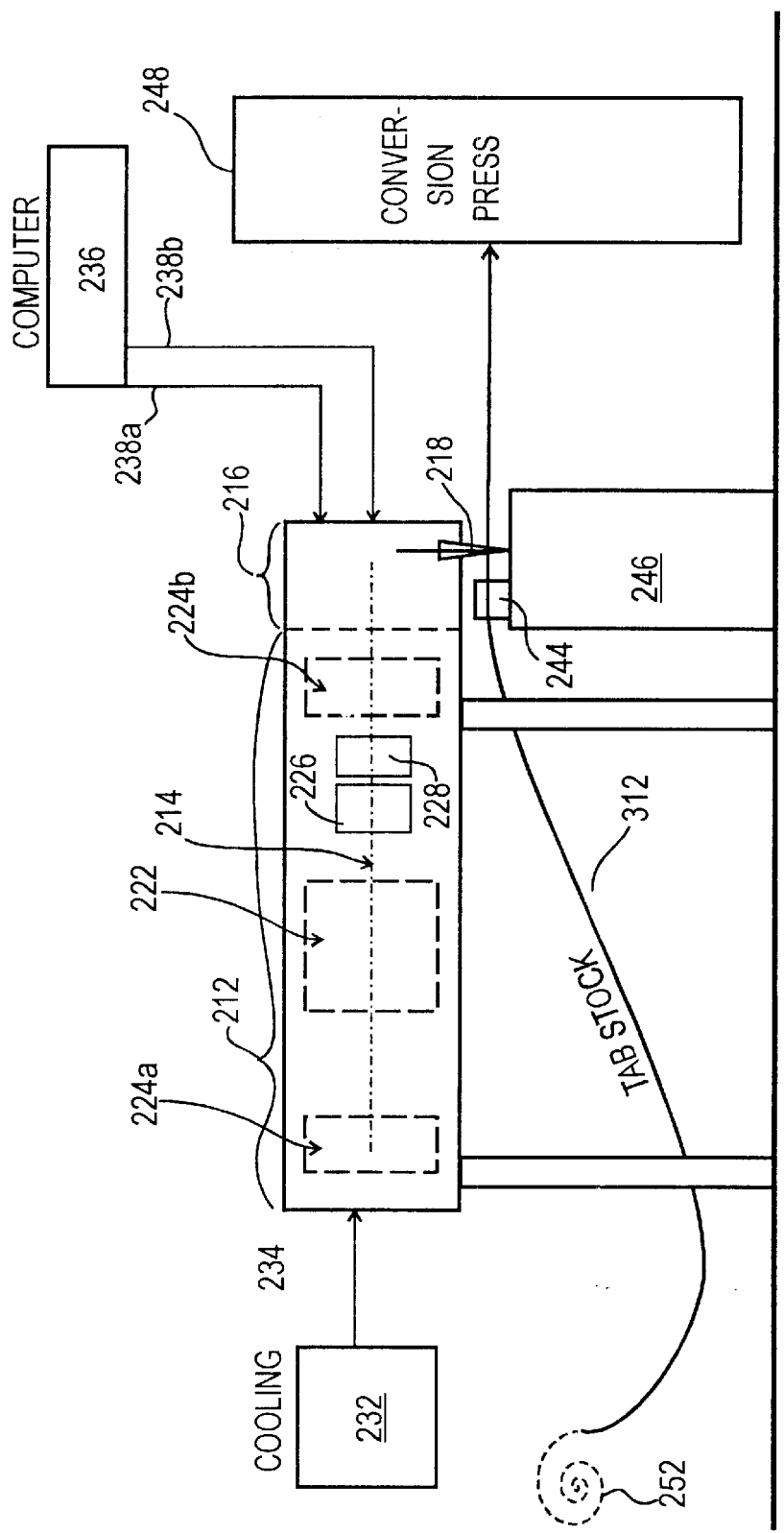
FIG. 2A is a block diagram depicting components of a container tab stock marking device according to an embodiment of the present invention.

FIG. 2A depicts one embodiment of an apparatus which can be used for making such markings within a time window of less than about 100 milliseconds, preferably less than about 50 milliseconds. A portion 212 of the device shown in FIG. 2 is used for generating a pulsed laser beam 214 which is then steered by a portion of the device 216 to output a laser beam 218 along a path so as to position pulses of the beam for forming markings 326 as described above. The laser includes a light source/pumping component 222 positioned between mirrors 224a,b to define a laser cavity. Preferably a safety valve 226 interrupts light output e.g. in the event of failure or container breach. A chopper 228 provides the light in a pulsed or intermittent form. In one embodiment, a Nd:YAG laser provides an output of about 40 to 50 watts (applied power), with about 80% of such power being delivered to the tab stock target. Preferably the laser is configured to output laser light pulses which are relatively stable in the sense that there is relatively little variation in power from one pulse to the next and, preferably substantially all pulses have sufficient power to vaporize or ablate the metal target sufficiently to produce a visible spot or mark. Laser devices that can be used in this regard include those available from Laser of Orlando, Fla. A cooling unit 232 is coupled 234 to the laser generation region 212 to maintain the proper operating temperature of the laser generating unit. A computer 236 which may be, e.g., a workstation-type computer preferably having a Pentium® or Pentium II® processor, outputs control signals 238a, 238b for controlling an x-steering galvanometer 242a and a y-steering galvanometer 242b, respectively, as described more fully below. One example of galvanometers that can be used for this purpose include galvanometers available from Cambridge Technology, Inc. of Watertown, Mass. The tab stock 312 is held at the desired distance from the laser and preferably in a vibration-free manner such as coupling guidance/advancement components 244 to a relatively vibration-free pedestal 246 such as a concrete-filled or other high-mass pedestal, vibration-isolation mounting or the like. In this way, a portion of the tab stock 312 can be held stationary during the dwell period for marking. As described above, during the advancement period of each cycle, the tab stock is advanced, using, e.g., drive rollers or the like, toward a stamping unit 248 as it is withdrawn from a tab stock coil 252 or similar source.

Figure 2B:
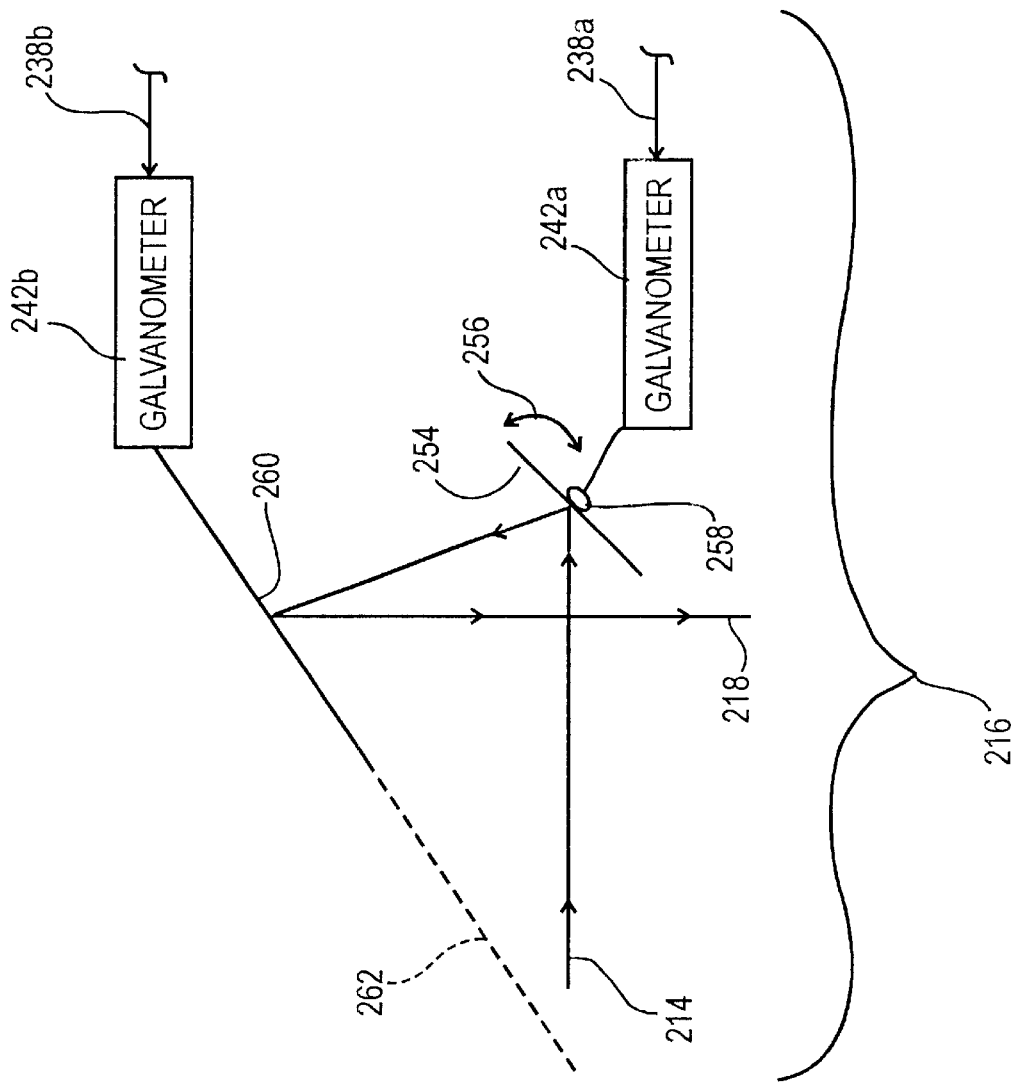
FIG. 2B is a block diagram of steering components of the device of FIG. 2A.

In the embodiment of FIG. 2B, the first steering galvanometer (e.g, a y-steering galvanometer 242a) is coupled to a movable, e.g., pivotable, mirror 254. Galvanometer 242a is coupled to the mirror 254 so that the mirror 254 is pivoted 256 about a pivot axis 258 (perpendicular to the plane of the paper in the view of FIG. 2B) in such a manner that the mirror 254, receiving the laser pulses, will reflect the pulses (to provide first reflected laser light pulses) at an angle whose magnitude depends on the pivoted position of the mirror 254. The first reflected laser light pulses are received by the second mirror 260 which is coupled to a second galvanometer 242b (e.g., an x-steering galvanometer 242b) so as to permit selectable pivoting about a second pivot axis 262 (parallel to the plane of the paper in the view of FIG. 2B) for reflecting the pulsed laser beam (to provide second reflected laser light pulses) toward the desired region of the tab stock 312. In the view of FIG. 2B, the pivot position of the y-steering mirror 254 determines the position of the beam, (with respect to the tab stock 312) in a longitudinal or y direction 322 while pivoting of the x-steering mirror 260 about the second axis 262 determines the position of the laser pulses (with respect to the tab stock 312) in the lateral or x direction 316.

In order to position the laser pulses as needed across the entire lateral extent 334 and longitudinal extent 332 needed to form a set of characters 326a, 326b, 326c as desired, within the dwell period, such as within about 50 milliseconds, the mirrors 254, 260, and particularly the x-steering mirror 260 (responsible for positioning through the relatively larger x range) must be moved quite rapidly. It is believed that previous steering devices have been incapable of, at a reasonable cost, providing such rapid mirror positioning. According to one embodiment of the present invention, rapid mirror positioning is facilitated by providing relatively low mass mirrors. The mirrors, in one embodiment, are provided in a lightweight configuration primarily by providing a relatively small surface or reflective area of the mirrors. In one embodiment, the mirrors have a nominal size or diameter of about 5 mm, such as being a square or rectangle with at least one edge having a length less than or equal to about 5 mm. The low mass mirrors provide a low moment of inertia to assist in rapid mirror movement. Preferably, each of the mirrors presents a moment of inertia to the respective galvanometers of less than about 0.2 $g/cm^2$, less than about 0.1 $g/cm^2$, and more preferably less than or equal to about 0.08 $g/cm^2$.

Because the reflective surface area of the steering mirrors is reduced, the beam size or aperture of the laser light which can be effectively delivered to the tab stock is relatively small.

In order to position the laser pulses, which are preferably being delivered at a rate of about 12 kHz, to the desired position, it is necessary to provide x and y control signals 238a, 238b which control the galvanometers 242a, 242b also at a rate of about 12 kHz. Preferably the computer 236 is configured (programmed) to output control signals to achieve the desired positioning at this rate as well as being controlled to retrieve, create or select the desired characters or indicia 326a–326d as needed for the particular application (e.g. random or pseudo-random indicia for certain contest or promotion purposes) and to make the character or indicia selections rapidly enough to provide a new set of selections during each cycle of the stamping device 248. Although it is at least theoretically possible to increase the lateral range 334 or longitudinal range 332 of the beam position by increasing the distance e.g. of the tab stock 312 from one or both mirrors, such increase in distance also increases the effect of beam divergence and, thus affects power density delivered at the tab stock. For example, by decreasing divergence by 50% (e.g. by positioning the tab stock closer), spot size at the tab stock is reduced to half the spot diameter, thus halving the power delivered, but, because area is proportional to the square of radius, doubling the power density. However, increasing power density by providing for closer positioning of the tab stock requires more rapid mirror movements to maintain the same marking speed (for a given range of character placement). Thus, in one embodiment, the tab stock 312 is positioned such that the spot size of the laser pulses as delivered to this tab stock has a diameter of about 3 mm and a power density of about 4 to 5 watts per $mm^2$.

Figure 4:
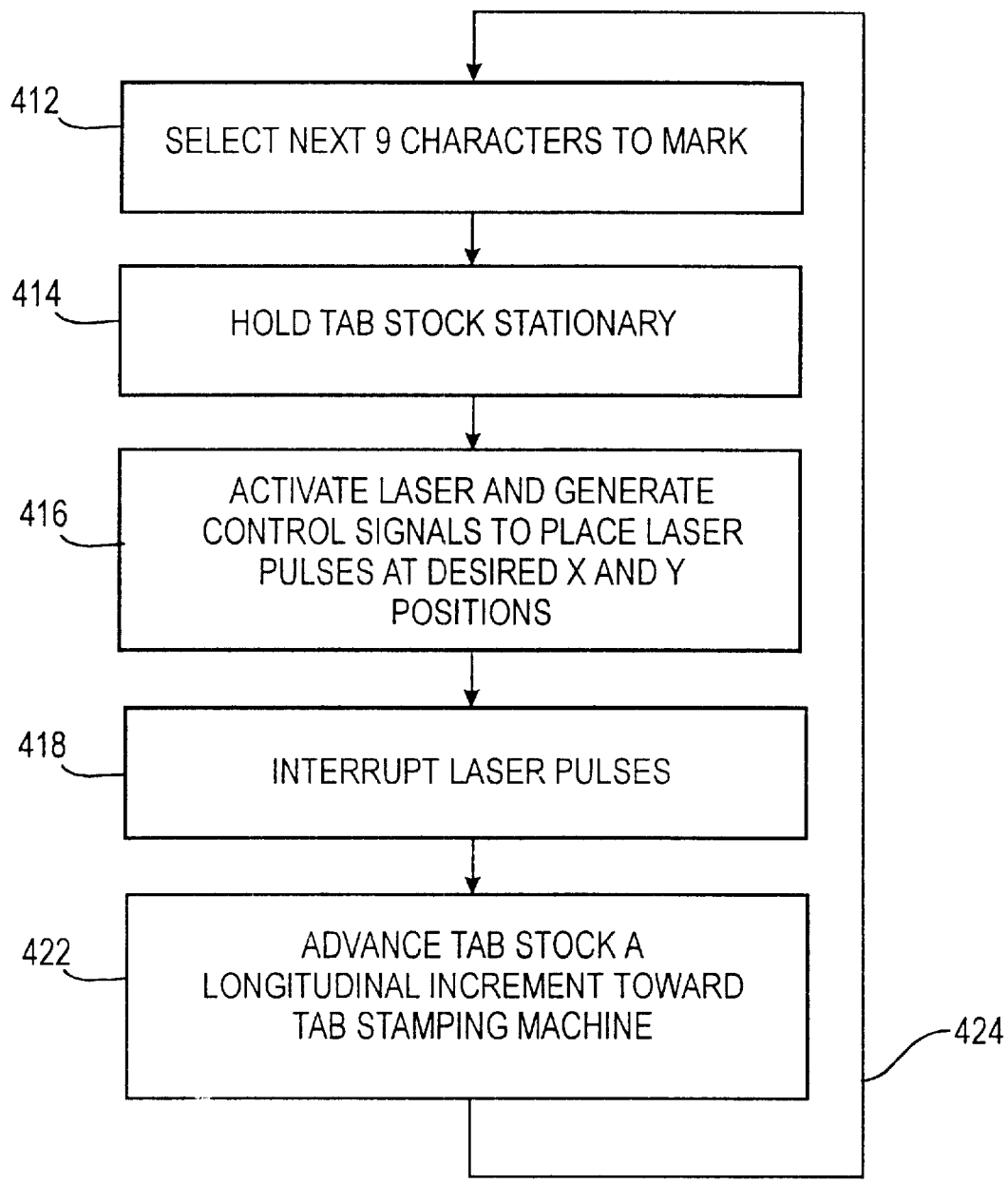
FIG. 4 is a flow chart depicting a marking process according to an embodiment of the present invention.

In operation, as depicted in FIG. 4, during one portion of the stamping cycle, the computer 236 selects the next nine characters which are to be marked on the tab stock 412. When the dwell period of the stamping cycle is reached, the tab stock is held stationary 414 and the laser light output is activated while the computer generates control signals to place laser pulses at the desired respective x and y positions to render the desired visible markings 416. After the desired markings have been made, the laser pulses are interrupted 418 and, during the advancement portion of the cycle, the tab stock is advanced a predetermined longitudinal increment toward the stamping machine. Thereafter, the cycle is repeated 424 as needed to provide the desired number of marked tabs or until the tab stock is depleted.

In light of the information provided herein, a number of advantages can be seen. The present invention is able to achieve markings of containers or container components at a relatively rapid rate, and, preferably, sufficiently rapidly to keep pace with other container or container component forming processes so that the marking can be achieved without slowing or interfering with such processes. The present invention makes it practical and feasible to provide markings which can be readily changed or customized, including markings which are different for each container or container component in a sequence of containers or components. The present invention can achieve such rapid markings substantially without distortion or deformation of the markings and without weakening, piercing or damaging the container or container component. The present invention makes it practical and feasible to provide six or more, preferably nine or more, legible, 0.125 inches tall or larger characters distributed or positioned across the width of tab stock in connection with a tab-forming process during a relatively short time period such as a tab-forming dwell time, preferably within about 100 milliseconds and more preferably within about 50 milliseconds. The present invention makes it possible to steer the positioning of laser pulses having sufficient power to mark or ablate metal across a lateral extent of about one inch and a longitudinal extent of about 0.125 inches within a time period of less than 100 milliseconds, preferably less than about 50 milliseconds. The present invention provides for container or container component marking which is less maintenance-intensive or more reliable than other marking procedures and devices and permits changes to markings without the need to stop or slow a container or container component fabrication device or process. The present invention facilitates implementation of contests, sweepstakes or other promotions which involve providing indicia on components or containers preferably on an undersurface of tabs coupled to containers, preferably so as to be non-visible prior to opening a container, e.g. awarding at least a first prize (indicated one of such indicia) to a customer upon verifying presence of the prize indicium e.g. on a tab. Because the characters, indicia, symbols and the like to be marked can be designed/created entirely (potentially) in software (i.e. without the need for ordering or creating dies or the like) the lead time involved between design of a promotion, game, or the like, taking of an order or other initiation event, and the time in which production can begin is substantially shortened compared to hardware-dependent dependent procedures such as incising or embossing.

A number of variations and modifications of the invention can be used. Although the present invention provides for a cost-effective procedure and device which may include a laser that delivers sufficiently-powered pulses at a rate of about 12 kHz, it is also possible to use the present invention in connection with other lasers, including lasers that have a higher pulse rate or higher power, preferably with each (or substantially each) pulse delivering sufficient power to ablate or vaporize aluminum or other metal such as to provide a visible mark. Although a galvanometer-based beam steering procedure and device has been described, other steering may be used including acoustico-optical steering in place of or in addition to galvanometer based steering, which offers the potential for steering which is at least partially independent of the mass of mirrors or other components and, thus, potentially more rapid. Although a computer has been described in connection with providing control or control signals for laser steering, other devices and procedures for providing control signals can be used including digital signal processors (DSP) which are believed to offer the potential for generating control signals at a relatively high rate, at least partially because of the elimination or reduction of rate dependency based on bus speed or the like.

Although embodiments have been described in regard to marking of stock used for forming tabs, the present invention can be used in connection with marking other portions of metal containers such as ends or end caps, body or sidewall portions, container bottom portions and the like.

Although a particular container end shape as depicted in FIG. 1, the present invention can be used in connection with a wide variety of metal containers including beverage containers, food containers, aerosol containers and the like. Although the present invention has been described in connection with marking of aluminum container or container components, the present invention can also be used in connection with marking other types of metal containers such as steel containers. Although the present invention has been described in connection with ablating or vaporizing portions of the metal of a metal container, it is also possible to use the present invention in connection with ablating or vaporizing some or all portions of coatings placed on a metal container, so as to provide markings that are visible by way of a contrasting color or texture. For example, it is possible to provide a metal container or container component which has been coated with a colored coating (such as by printing or painting) and to use the present invention to selectively remove or vaporize portions of such coatings to reveal at least some of the metal portion (or another coating) Underneath. In this situation, it may be possible to use a lower-powered laser such as a $CO_2$ laser.

Although the embodiment of FIG. 1 depicts a tab having a web in the finger grasp region, it is also possible to use the present invention in connection with a tab in which a finger hole is provided in the finger grasp region and in which markings are positioned on other portions of the tab.

Although the present invention has been described in connection with certain markings which will typically be viewed or visible to consumers such as promotional or contest marking, advertising, logos, etc., it is also possible to use the present invention in connection with markings which will typically be concealed such as being concealed under a fold of the tab or other container component. As one example, concealed markings may be used for security or verification purposes, e.g. to verify that a prize-indicating marking is genuine and not counterfeit. Although the present invention has been described in connection with providing markings during a stationary or dwell time, it is also possible to use the present invention to make some or all markings during movement of the tab stock or other target substrate, particularly when the markings are security or internal markings or otherwise will not normally be seen or used by the ordinary consumer (such that a certain amount of distortion may be acceptable).

Although the present invention has been described in connection with beam steering which utilizes two separate mirrors, it is possible to provide for beam steering which uses a single mirror (e.g. which is pivotable with respect to two independently controllable axes, and/or which is deflectable or deformable). Although the present invention has been described in connection with a process which uses a single laser for writing all the desired markings during any given cycle (believed to be particularly useful when it is desired to provide markings in a low-cost manner), it is nevertheless also possible to use the present invention in connection with a system having two or more lasers such as for writing different characters or different portions of characters so as to achieve a higher number of characters in a given amount of time. Although the present invention has been described in connection with a procedure providing at least six legible characters, preferably at least nine legible characters per cycle, the present invention can also be used in connection with devices or procedures which produce more or fewer characters.

In general, it is possible to use some aspects of the invention without using others. For example, it is possible to provide for rapid marking of characters or other indicia without providing for randomly or otherwise changing the indicia with each cycle. For example, in view of the ability to rapidly change or modify the nature of the indicia or markings provided, the present invention can be used to provide markings which indicate time and/or date of manufacture, filling, sealing and the like. Although the present invention has been described in connection with making markings e.g. for promotional, advertising, identification or similar purposes, it is also possible to use the present invention in connection with making lines, grooves, or other formations which may be at least partially functional or structural such as by using the present invention to create opening-defining scores in container ends and the like. Although the present invention has been described in connection with placing markings on tab stock before the tab stock is formed, cut or attached to containers or container ends, it is possible to provide the steps in other orders such as marking tabs e.g. after folding but before cutting, after cutting but before attachment to containers, or after attachment to containers.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended the appended claims be construed to include alternative embodiments to the extent permitted.

What is claimed is:

1. A process for promoting sales to customers, comprising:
    using a laser to place indicia on a plurality of container-opening tabs, including placing at least a first prize indicium on an under surface of at least a first of said plurality of tabs, said using step including steering laser light by a light path deflection system having at least one component that contacts said laser light to provide steered light and said placing step includes placing said first prize indicium utilizing said steered light, said using step being conducted while said at least first of said plurality of tabs is substantially stationary;
    coupling said plurality of tabs with respect to a plurality of containers, wherein at least said first tab is coupled so that said under surface is non-visible prior to opening said container; and
    awarding said prize to a customer upon verifying the presence of said prize indicium on said first tab.

2. A process as claimed in claim 1 wherein said step of using a laser to place indicia comprises:
    using a laser to place indicia on a plurality of spaced-apart regions of a continuous metallic web; and
    separating said web into a plurality of tab portions, at least some of said tab portions containing at least one of said indicia.

3. A process as claimed in claim 1 wherein said step of coupling comprises:
    coupling at least said first tab such that said under side is visible after opening said container.

4. A process as claimed in claim 1 wherein all of said indicia on said plurality of container-opening tabs is placed during a dwell time when all of said plurality of container-opening tabs are substantially stationary.

5. A process as claimed in claim 1 wherein said steering step includes moving said laser light in each of a x-direction and a y-direction.

6. A process as claimed in claim 1 wherein said light path deflection system includes a first mirror and a first galvanometer coupled to said first mirror to position said first mirror, said first mirror presenting a moment of inertia to said first galvanometer of less than about 0.2 g/cm².

7. A process as claimed in claim 1 wherein said at least one component of said light path deflection system includes a first mirror having a nominal dimension of less than about 5 mm.

8. A process for promoting sales, comprising:

providing tab stock containing regions which are to be formed into tabs including at least a first tab;

using a light path deflection system to position laser light from a laser in order to place at least a first prize indicium on an under surface of at least said first tab while said first tab is substantially stationary during a dwell time associated with said tab stock; and coupling at least said first tab with respect to a first container, wherein at least said first tab is coupled so that said under surface is non-visible prior to opening said first container.

9. A process as claimed in claim 8 wherein said using step includes locating a first mirror utilizing a first galvanometer and in which said first mirror presents a moment of inertia to said first galvanometer of less than about 0.2 g/cm².

10. A process as claimed in claim 8 wherein said dwell time is less than about 100 milliseconds.

11. A process as claimed in claim 8 wherein during said dwell time at least one predetermined function is being conducted using at least portions of said tab stock at the same time said first prize indicium is being placed on said first tab.

* * * * *